UNITED STATES PATENT OFFICE.

ERICH STROHBACH, OF DRESDEN, GERMANY.

PROCESS OF MAKING IRON-FREE ALUM.

932,067.  Specification of Letters Patent.  Patented Aug. 24, 1909.

No Drawing.  Application filed October 20, 1906.  Serial No. 339,774.

*To all whom it may concern:*

Be it known that I, ERICH STROHBACH, a subject of the King of Saxony, residing at Niedersedlitz, Dresden, Germany, have invented certain new and useful Improvements in Processes of Making Iron-Free Alum; and I do hereby declare the following to be a full, clear, and exact description of the invention, such as will enable others skilled in the art to which it appertains to make and use the same.

This invention relates to the manufacture of alum and consists in a method of producing sodium alum and other alums in the form of meal crystals by crystallizing the same at regulated temperatures and under regulated conditions from alum-forming solutions containing an excess of an alum-forming reagent; all as more fully hereinafter set forth and as claimed.

Sodium alum though commercially desirable because of the low cost of its components and the relatively large percentage of the active component, aluminum sulfate, which it contains, is not largely produced because of the difficulty of crystallizing it in clean crystals substantially free of iron. In concentrated solutions it readily forms a soft doughy or pasty mass from which the mother liquor cannot be easily separated and which cannot easily be freed from iron or other impurities.

I have discovered that by adopting certain precautions in its formation it may be obtained in the form of a fine crystal meal, substantially free of iron, even where cheap raw materials containing iron are used. The crystals obtained are non-efflorescent and of good keeping quality.

In the prior art, sodium alum has generally been made by mixing equivalent amounts of solutions of sodium sulfate and aluminum sulfate, both as free of iron as possible, and crystallizing at a temperature between 10° and 25° C. At 28° no substantial crystallization takes place in these prior methods. In order to avoid the presence of iron in the sodium alum solution, it is generally previously precipitated out by using a little sodium carbonate in lieu of part of the sulfate; and, as a result, the mixture submitted to crystallization has no free acid. In the present invention, on the contrary, I crystallize the sodium alum at higher temperatures, generally between 25° and 50° C., and use an excess of the alkali sulfate. In the presence of this excess, the solubility of the sodium alum is reduced and it crystallizes readily and quickly. And instead of neutral or basic solutions being necessary, as has been deemed to be the case in the prior art, I find that I can advantageously work from acid solutions. These need not be free of iron. From acid solutions containing an excess of alkali sulfate, sodium alum crystallizes readily, substantially free from iron and chlorin. In such an acid solution, sodium alum is comparatively little soluble, crystallizing from it readily, while these impurities remain in solution.

The following practical example is given to illustrate the manner in which my new process for the manufacture of sodium alum may be carried out in its preferred form: One hundred parts by weight of commercial aluminum sulfate solution containing 6.22 parts of $Al_2O_3$, having a specific gravity of about 1.250 at 15°, centigrade, and containing about 0.07 parts of iron is mixed with from one to five parts by weight of concentrated sulfuric acid, according to the amount of iron contained in the aluminum sulfate solution. This mixture is then heated to from 25° to 30° centigrade and filtered if necessary, that is, if not clear. To the resultant solution there is added, while constantly stirring, finely ground dried or calcined Glauber salt of the commercial grade in such quantity that it will not only combine with the aluminum sulfate present, but will leave an excess sufficient to form an almost saturated solution of sodium sulfate. In this particular example there are employed for this purpose 10 parts by weight of Glauber salt of 95 per cent. purity, that is containing, in 100 parts, 95 parts of $NA_2SO_4$. Formation of sodium alum begins at once under these conditions with a rise of temperature and is soon completed if the stirring be continuous. The magma of small crystals of sodium alum formed in this way is readily separated by centrifugal action, giving a shining white alum meal, almost free from chlorin and almost free from iron, the latter never exceeding 0.030 parts by weight. It contains 11.2 parts by weight of $Al_2O_3$. This crystal-meal may be dried in any suitable manner at a temperature below 50° centigrade, giving a permanent non-efflorescent and practically stable product. If a chemically pure product is desired, this crystal meal may be recrystallized by stirring it with an amount of water insufficient to dissolve it at 30° C. and gradually heating till solution becomes complete. The liquid is then evaporated to about two-thirds the original volume and, after filtration is necessary, it is quickly cooled to 30° to 40° C. The cooling apparatus should have as large a cooling surface as possible to permit rapid cooling. By now stirring vigorously after inoculation with pure sodium alum crystals, small, meal-like crystals of chemically pure sodium alum separate. With this method of operation, the formation of the usual amorphous paste is not to be feared. This method of operation, i. e., inoculation and vigorous stirring of the supersaturated solution, is also advantageous in the direct production of sodium alum in meal-like nearly pure crystals from commercial aluminum sulfate solution containing much iron, and advantageously somewhat acid, by the use of an excess of sodium sulfate.

Potassium and ammonium alums in meal crystals, a form very advantageous commercially as permitting quick solution in use, may be produced in an analogous manner to that described for sodium alum. An excess of aluminum sulfate may be used in lieu of an excess of alkali sulfate in this case. At the most, the production of the meal crystals does not require more than five hours, if stirring be vigorous, as compared with the customary method of slow crystallization in vats, a method generally requiring several days, while the product is purer. The yield is very good.

In making the sodium and other alums with an excess of alkali sulfate in acid solutions, of course the bisulfates may be employed in lieu of adding sulfate and acid separately. Sodium alum may be directly produced from a strong solution of sodium bisulfate and concentrated aluminum sulfate solution. With certain alums, in lieu of alkali sulfates, double sulfates, such as sodium magnesium sulfate, may be employed.

In the specific example given, dry sodium sulfate was added to a concentrated aluminum sulfate solution but the reverse may also be done, solid aluminum sulfate, which may contain much iron, being added to a strong solution of Glauber salt made acid with concentrated sulfuric acid to an extent corresponding to the amount of iron; the sodium sulfate being in excess of the amount required. Potassium and ammonium alum may also be produced by adding dry aluminum sulfate to acidified concentrated solutions of the corresponding sulfates in amount in excess of such aluminum sulfate.

Having thus fully described my invention, what I claim as new and desire to secure by Letters-Patent, is:—

1. The process of preparing alum from alkali sulfate and aluminum sulfate which consists in forming a concentrated solution of one such sulfate and stirring the other into it in a dry state, the alkali sulfate being in excess of the amount necessary to form alum with the aluminum sulfate.

2. The process of preparing alum from alkali sulfate and aluminum sulfate which consists in forming a concentrated, acidified solution of one such sulfate and stirring the other into it in a dry state, one of said sulfates being in excess of the amount necessary to form alum with the other.

3. The process of preparing alum from alkali sulfate and aluminum sulfate which consists in forming a concentrated acidified solution of one such sulfate and stirring the other into it in a dry state, the alkali sulfate being in excess of the amount necessary to form alum with the aluminum sulfate.

4. The process of forming sodium alum from sodium sulfate and aluminum sulfate which consists in forming a concentrated solution of one such sulfate and stirring the other into it in the dry state, the sodium sulfate being in excess of the amount necessary to form alum with the aluminum sulfate.

5. The process of preparing sodium alum from sodium sulfate and aluminum sulfate which consists in forming a concentrated acidified solution of one such sulfate and stirring the other into it in a dry state, one of said sulfates being in excess of the amount necessary to form alum with the other.

6. The process of forming sodium alum from sodium sulfate and aluminum sulfate which consists in forming a concentrated acidified solution of one such sulfate and stirring the other into it in the dry state, the sodium sulfate being in excess of the amount necessary to form alum with the aluminum sulfate.

7. The process of preparing sodium alum from sodium sulfate and aluminum sulfate which consists in forming a concentrated solution of one such sulfate, stirring the other into it in a dry state, thereby forming a supersaturated solution of sodium alum, inoculating with crystallized sodium alum and stirring till the sodium alum separates in meal crystals.

In testimony whereof I have signed my name to this specification in the presence of two subscribing witnesses.

ERICH STROHBACH.

Witnesses:
  PAUL ARRAS,
  OTTO LAUFFMANN.